United States Patent [19]
Clark et al.

[11] Patent Number: 5,230,402
[45] Date of Patent: Jul. 27, 1993

[54] ELECTRIC-HYDRAULIC CAR

[75] Inventors: Richard W. Clark, 12844 N. Paradise Village Pkwy., Phoenix, Ariz. 85032; Howard Greene, 1322 W. Aster Dr., Phoenix, Ariz. 85029

[73] Assignees: Richard Clark; Howard Greene; Louis Spelts, Jr.; Edward T. Spelts; Ingrid Spelts; Marc Archer; Doreen Morehouse, all of Phoenix, Ariz.; Karen Storey, Fullerton; Paul D. Young, Belle Fourche; Christine L. Young, both of Belle Fourche, S. Dak. ; a part interest

[21] Appl. No.: 858,414

[22] Filed: Mar. 27, 1992

[51] Int. Cl.$^5$ .............................................. B60K 17/00
[52] U.S. Cl. .................................... 180/307; 180/305
[58] Field of Search ............... 180/305, 307, 308, 165; 363/131, 132; 307/10.1; 310/112, 114, 72, 207, 177, 198

[56] References Cited

U.S. PATENT DOCUMENTS

| | | | |
|---|---|---|---|
| 3,912,033 | 10/1975 | Ancel | 180/307 |
| 4,395,878 | 8/1983 | Morita et al. | 180/307 |
| 5,158,150 | 10/1992 | Askeland et al. | 180/305 |

FOREIGN PATENT DOCUMENTS

| | | | |
|---|---|---|---|
| 2642275 | 3/1978 | Fed. Rep. of Germany | 180/305 |
| 8300205 | 1/1983 | World Int. Prop. O. | 180/305 |

Primary Examiner—Eric D. Culbreth
Attorney, Agent, or Firm—LaValle D. Ptak

[57] ABSTRACT

An electric car is powered from a primary power source in the form of a three-phase parallel resonant electric motor operated at a constant speed (the speed of resonance). The electric motor is provided with operating power from an invertor coupled to storage batteries in the electric car. The motor drives a main hydraulic pump, which is hydraulically connected with a pair of variable displacement drive motors, each connected to different drive wheels on opposite sides of the vehicle. The fluid flow through the pump is varied from 0% to 100% to control the speed of operation of the drive motors connected to the drive wheels of the vehicle.

14 Claims, 1 Drawing Sheet

ELECTRIC-HYDRAULIC CAR

BACKGROUND

Throughout the world, there is increasing concern over the deteriorating quality of the air, particularly in and around large metropolitan areas. It has been found that much of the air pollution which exists, particularly in large cities, is caused by hydrocarbon emissions from the internal combustion engines used in automobiles and trucks. The problem is extremely serious in cities such as Los Angeles, Calif., U.S.A., Mexico City, Mexico, and Tokyo, Japan, to name a few.

Even where pollution from internal combustion engines is not currently a significant problem the huge quantities of petroleum deposits consumed by automobiles and trucks, is rapidly depleting the known oil reserves of the world. Petroleum deposits are currently used as the backbone ingredients for ever increasing plastics manufacturing, synthetic fibers used in clothing, and many other products. To use these finite reserves of petroleum deposits as a source of fuel for automobiles and trucks, is widely considered an inefficient and wasteful use of this valuable resource.

As a result of the foregoing, intensive research and experimentation has been undertaken to develop an energy efficient electric car. Typically, electric cars are operated from rechargeable storage batteries, which drive direct current drive motors attached to the drive wheels of the car. Lightweight, compact cars, particularly suited for short trip operation in metropolitan areas, have been developed. A primary shortcoming of electric cars developed in the past, however, is the relatively limited range of operation which exists between battery charging cycles. When a typical lead-acid battery is used, the battery charging cycle is generally a matter of hours (preferably, overnight) after the batteries have reached a sufficient level of discharge so that the car no longer can be operated. For many electric cars, the operating range is less than one hundred miles before the batteries require recharging.

As the number of batteries required to operate the car is increased, the weight of the car increases in direct proportion, thereby reducing the useful load capacity of the car in that same proportion. As a result, simply adding more batteries to obtain greater range is not an ideal solution.

Accordingly, it is desirable to provide an electric car which overcomes the disadvantages of the prior art listed above, which is efficient in operation, and which has substantially increased range of operation between battery charging cycles.

SUMMARY OF THE INVENTION

It is an object of this invention to provide an improved electric car.

It is another object of this invention to provide an improved electric car which is efficient in operation, and which is capable of being driven a considerable distance between battery charges.

It is an additional object of this invention to provide an improved electric/hydraulic car.

It is a further object of this invention to provide an electric car, which uses a parallel resonant alternating current motor powered by storage batteries as its primary power source, to drive a hydraulic pump/motor system for controlling the operation of the car.

In accordance with a preferred embodiment of this invention, a vehicle propulsion system for an automobile or the like employs a primary power source operating at a constant speed output. A source of energy is coupled with this power source to operate it; and a main hydraulic pump is coupled with the constant speed power source to be driven thereby. A hydraulic fluid reservoir is coupled with the pump to supply fluid to the pump; and at least one hydraulic drive motor is coupled with the hydraulic pump to receive fluid flow from it for application to the drive wheels of the vehicle. Provision is made to vary the fluid flow through the pump to, in turn, vary the speed of operation of the drive motor used to propel the vehicle.

In a more specific embodiment of the invention, the constant speed power source comprises a parallel resonant alternating current motor powered by batteries in the vehicle through an invertor.

DETAILED DESCRIPTION

Figure 1:
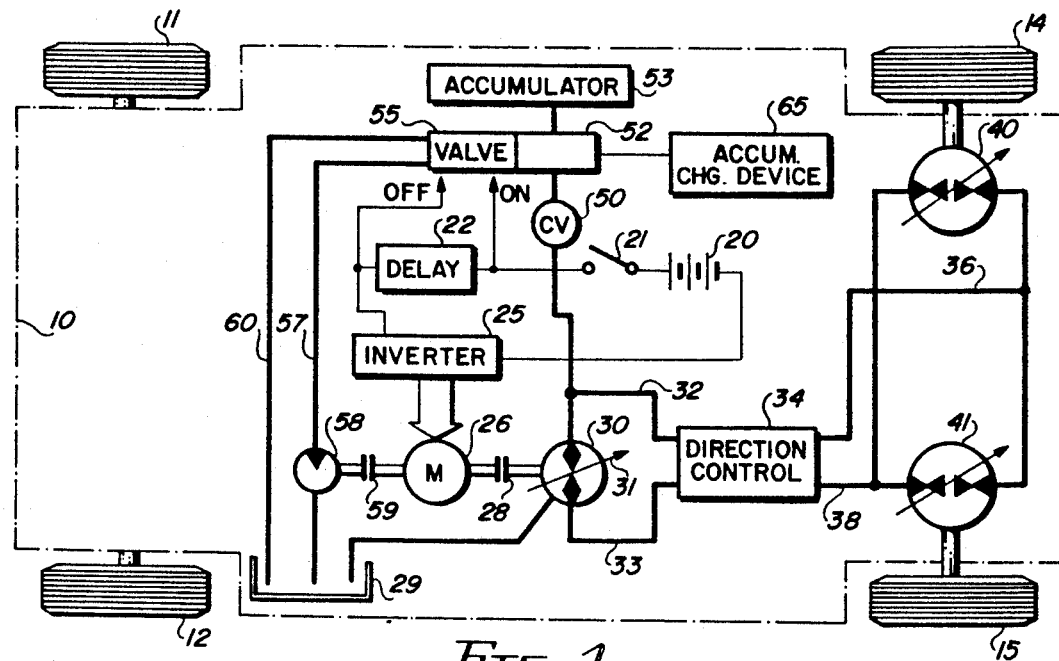
FIG. 1 is schematic block diagram of a preferred embodiment of the invention.

Reference now should be made to the drawing, in which the same reference numbers are used throughout the different figures to designate the same or similar components. FIG. 1 is a diagrammatic representation of an electric-hydraulic powered car, in accordance with a preferred embodiment of the invention. The chassis of the car 10 is indicated in dot-dash lines in FIG. 1. Attached to this chassis, in a suitable conventional manner, are a pair of front wheels 11 and 12, and a pair of rear wheels 14 and 15. Typically, the front wheels 11 and 12 are steerable wheels, while the rear wheels 14 and 15 are drive wheels. The invention, however, could be incorporated into a front wheel drive car, in which the wheels 11 and 12 constitute both the steerable wheels and the drive wheels. Techniques for accomplishing these features, in conjunction with the car or other vehicle with which the invention is used, are standard, and for that reason are not illustrated in any detail in FIG. 1.

The electric-hydraulic car is provided with a source of energy from a set of series-connected batteries 20. Typically, a battery bank of up to a maximum of twelve 6-Volt batteries is utilized. With a battery bank of eleven batteries, a theoretical voltage of 66 Volts is obtained from such a bank of batteries.

When operation of the vehicle is desired, an on/off normally open switch 21 is closed to apply power from the battery bank 20 to the electrical portions of the vehicle system. This power is immediately applied to a valve 55 in the hydraulic system to open a line from an accumulator 53 to an accumulator input/output device 52. The valve 55 then supplies hydraulic fluid under pressure through a line 57 to an hydraulic starter motor 58.

The motor 58 is coupled through a clutch 59 (closed only during start) to begin rotation of the rotor of a constant speed three-phase electric motor 26 to bring the rotor of the motor 26 near or up to the operating or run speed of operation. The hydraulic start motor 58 is used for this purpose to minimize the amount of current drawn from the batteries 20 upon initial start-up of the car. This is particularly important because the electric motor 26 is operated as a parallel resonant motor, utilizing larger than normal wire sizes for the windings. As a consequence, if the motor 26 were started directly from the battery power source, the starting current would be substantial, because the DC resistance of the motor is relatively low. The hydraulic start motor 58 prevents this high current draw from taking place at start-up. It also may be possible to use a small electric motor to start the motor 26 in place of the hydraulic motor 58. The accumulator 53 and related apparatus then could be eliminated. The hydraulic motor 58, however is believed to be the most efficient approach.

To ensure that no current is drawn by the motor 26 during the start-up phase, the application of operating power from the closure of the switch 21 is delayed by a delay circuit 22; the length of delay of which is selected to be sufficient to allow the hydraulic start motor 58 to bring the motor 26 up to operating speed before power is applied to an invertor 25. The output of the delay circuit 22 also is applied to the valve 55 to turn it "off". This, in turn, terminates operation of the starter motor 58, and the clutch 59 is released.

Figure 2:
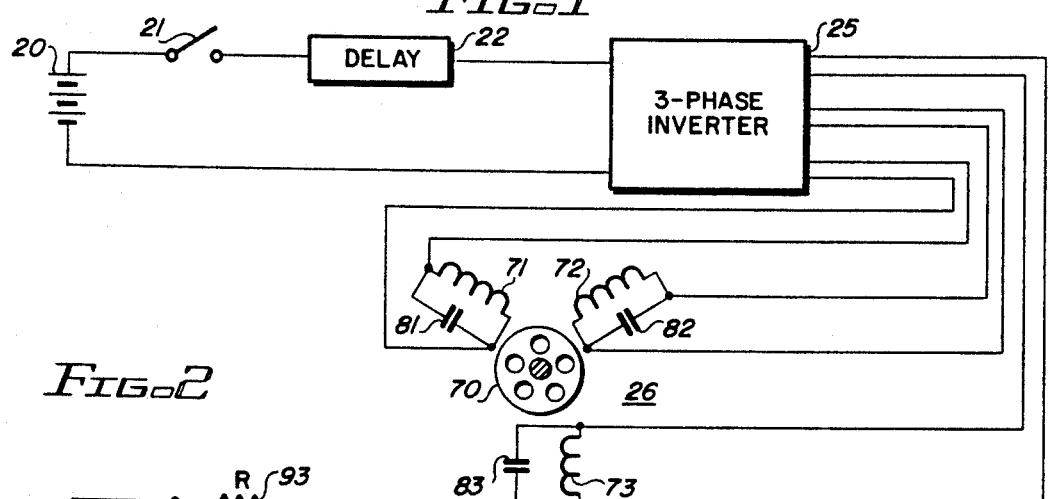
FIG. 2 is a schematic block diagram of the electrical operating system of the embodiment shown in FIG. 1.

The invertor 25 is a standard direct-current to three-phase invertor employing a DC chopping circuit and conventional circuitry for producing 120 Hertz alternating current power to the motor windings. The specifications for the motor 26 and the specific manner of its operation are described in greater detail in conjunction with FIG. 2. For the present, however, once the motor 26 is brought up to operating speed, it should be noted that the power applied to the motor through the invertor 25 causes the motor to operate constantly at its synchronous speed (2400 RPM for an operating embodiment of the invention). It also may be desirable to add a clutch-engaged flywheel to the shaft of the motor 26 to assist in maintaining the constant speed of operation.

A clutch 28 is used to couple the constant speed electric motor 26 to a main hydraulic pump 30, which provides the hydraulic oil flow used to drive the rear wheels 14 and 15 of the vehicle. The oil flow through the pump 30 may be varied from 0% to 100% by means of a variable control 31. The control 31 typically is connected to the "accelerator" of the vehicle, so that the driver of the vehicle operates it in the same manner as conventionally powered vehicles.

Oil flow out of the pump 30 passes through a line 32, and into a direction control (forward/reverse) valve 34. For operation of the vehicle in a forward direction, the fluid from the direction control 34 passes outwardly through a line 36 and is applied in parallel to a pair of variable displacement hydraulic drive motors 40 and 41 of conventional construction. These motors, in turn, have their output shafts coupled, respectively, with the rear drive wheels 14 and 15 of the vehicle.

For maximum efficiency and minimum energy consumption, it would be desirable to use a single drive motor 40 and 41 to drive only one of the wheels 14 and 15. This, however, results in a turning problem whenever the vehicle is turned sharply in the direction of the side of the vehicle on which the wheel is mounted. This causes lost torque when turning in this direction. By using two drive motors 40 and 41, the problem is eliminated. By applying the output oil flow from the pump 30 to both of the drive motors 40 and 41 through the line 36, the oil flow automatically increases through the one drive motor which requires a higher RPM (the motor driving the outside wheel) in turns. The oil flow automatically decreases proportionally in the other drive motor at the same time. The use of a second drive motor slightly decreases the efficiency of the hydraulic system (approximately 5% or so) over a system which employs only a single motor. However, for the reasons discussed here, the second drive motor must be used unless a single drive motor with a limited-slip differential is employed.

Oil returns from the motors 40 and 41 through a line 38 to the direction control 34 and the line 33, back to the main hydraulic pump 30. If the direction control 34 is switched to "reverse", the flow from the line 32 then is applied outwardly through the line 38 to both of the motors 40 and 41, while the return takes place through the line 36 to the direction control unit 34. The valving arrangement in the control unit 34 may be any suitable arrangement to permit forward/reverse operation of the hydraulic motors 40 and 41. This is the only "gearshift" required in the vehicle, since the motors 40 and 41 essentially operate as an automatic transmission in the vehicle. Typical torque ratios for the motors 40 and 41 are 4:1, and this can be extended to as much as 12:1. The torque is automatically obtained in the system by using automatic controlled high pressure variable displacement motors.

The main hydraulic pump 30 typically has a charge pump built into it to supply make-up oil flow from a sump 29 to replace any oil leakage in the main pump 30. Charge pumps are employed with main hydraulic pumps in a variety of different hydraulic systems; and conventional charge pump devices may be used.

As mentioned above, the start-up of the electric motor 26 is effected by means of a small hydraulic drive motor 58 to bring the rotor of the electric motor 26 up to or near its synchronous operating speed prior to the application of electrical power to the motor 26. To accomplish this, the accumulator 53 is provided. Oil under pressure from the charge pump 30 is tapped off through a check valve 50, and supplied through the input/output device 52 to the accumulator 53 to store sufficient hydraulic fluid under pressure for operating the starter motor 58. Typically, the accumulator 53 is a pressure tank with pressurized nitrogen encapsulated into the tank. Thus, the accumulator is "recharged" during the operation of the main hydraulic pump 30; and the check valve 50 prevents any reverse flow of fluid back from the accumulator 53 into the main hydraulic system.

As mentioned above, the valve 55 is normally closed or off and is only turned on upon the initial closure of the switch 21. After the time period established by the delay circuit 22, the valve 55 is turned off again, and remains off during the remainder of the normal operation of the system. At such time as the starter motor 58 is no longer used to rotate the rotor of the electric motor 26, the clutch 59 is disengaged to prevent any dissipation of power during the normal operation of the system. The manner of engagement and disengagement of the clutch 59 may be by means of any automatic centrifugal mechanism, or other mechanism.

In the event that the accumulator 53 should somehow lose charge, the system may be provided with an optional accumulator charging device 65 of conventional construction, to permit a recharging of the accumulator 53 when the main hydraulic pump 30 is not operating. The accumulator charging device may be an electrical and/or manual power device for accomplishing recharging of the accumulator in the event pressure is lost. It is considered desirable to provide such a device with the vehicle, since at the present time very few, if any, automotive repair centers have hydraulic accumulator chargers. The device 65, however, is an optional device, and is not necessary to the overall operation of the system described above.

As is readily apparent from an examination of FIG. 1, the sump 29 operates as an oil reservoir for the system. Typically, this reservoir is designed to have a 10 to 12 gallon capacity for the operation of an electric car having a weight of between 2500 pounds and 3000 pounds (including the batteries for the battery bank 20).

In the embodiment shown in FIG. 1, the drive motor 26 is a 15 horsepower three-phase Wye wound six-pole motor. There is no common ground, however, for the motor windings 71, 72 and 73, but each phase is isolated from the others. This is accomplished by transformer coupling in the inverter 25. The synchronous speed of the motor is selected to be 2400 RPM. The frequency of operation provided by the three-phase invertor 25 is 120 Hertz. The motor 26 is designed to be a high "Q" motor having a "Q" factor in excess of 2 (actually 5 to 12 or more). To accomplish this, the run windings 71, 72 and 73 of the motor, for driving the rotor 70, are wound with a wire size significantly greater than the wire size normally used for such a motor. In the motor 26 described above, the windings are wound with a wire which has 1,079 circular Mils/Amp. This is contrasted with typical wire sizes, which have approximately 500 circular Mils/Amp for motors of this type as noted above, the result of doing this is a significant lowering of the DC resistance of the motor; so that the starting current for the motor would be significantly increased. This is the reason the auxiliary hydraulic starter motor 58 is employed.

Each of the windings 71, 72 and 73 of the motor 26 has a capacitor 81, 82 and 83, respectively, connected across it. The windings 71, 72 and 73 are designed to have as high an inductance as possible; so that the value of the capacitance for the capacitors 81, 82 and 83 may be reduced as much as possible. The parallel-connected windings and capacitors 71/81, 72/82, and 73/83, each form an LC parallel resonant circuit at the operating frequency of the motor (120 Hertz in the present example). The result of this operation is a significantly reduced operating current over that of conventional motors, which do not utilize resonance with the run windings of the motor. Because the parallel resonant motor 26 is operated at a constant synchronous speed of operation, the maximum efficiency attainable from the motor 26 results. This translates into a reduced current flow from the batteries 20. Thus, the time for discharging the batteries 20 to a point where recharging is required is longer than it would be if variable speed DC motors were used to drive the drive wheels of the vehicle directly from the batteries.

Since the electric motor 26 operates at its optimum or synchronous speed, at which parallel resonance of the LC winding circuit occurs, the drain on the batteries 20 is relatively constant. For a typical, presently available, lead-acid battery bank 20, the amount of time to discharge the batteries to the point where recharging is necessary is slightly less than six hours. If the vehicle is operated at 60 MPH, without any stopping or slowing, the range attainable between charges is nearly 360 miles. This is a significant improvement over conventional electric cars using an all-electric drive system.

Figure 3:
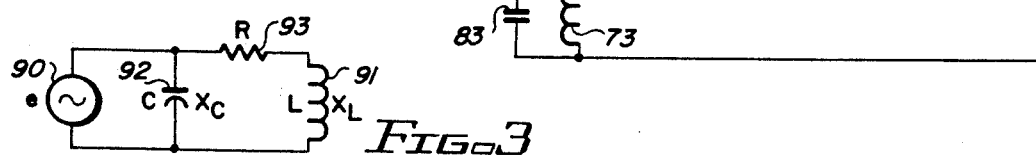
FIG. 3 is a detail illustrating the manner of operation of the embodiment of FIG. 2.

Reference should be made to FIGS. 3 and 4A through 4C for a general understanding of the LC resonant tank circuits, which are used in conjunction with the motor windings 71, 72 and 73 of the motor 26. FIG. 3 diagrammatically outlines a typical parallel resonant circuit, including an inductor 91 connected in series with a resistor 93 across a capacitor 92, to which alternating current power 90 is applied. The inductor branch always includes both inductive reactance and resistance. The resistor 93 is indicated as a typical resistance for any one of the inductors used in the motor 26, or any other systems in which an inductor is used. Because the inductor branch includes both inductive reactance and resistance, the current iL (FIGS. 4A through 4C) lags the source voltage e (FIGS. 4A through 4C) by the phase angle 0. If the frequency is raised, the impedance of the inductor branch increases, and the angle 0 moves closer to 90°.

Figures 4A, 4B, 4C:
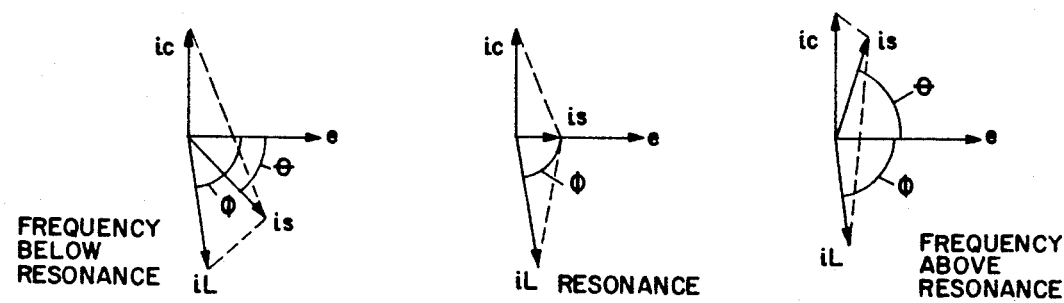
FIGS. 4A through 4C are vector diagrams useful in explaining the operation of the motor system of FIG. 2.

The capacitor current Ic, leads the source voltage, e, by 90°, while the supply current, Is, is the phaser sum of Ic and IL. FIGS. 4A through 4C show the changes which occur in the behavior of the circuit as the frequency is varied. At all frequencies below the resonant frequency, the supply current lags the source voltage by the total phase angle, 0, and the circuit behaves inductively. When the frequency exceeds its resonant value, the supply current leads the source voltage, and the circuit is capacitive.

At resonance, FIG. 4B, the supply voltage and the supply current are in phase; so that the angle, 0, is 0. As suggested by the phaser diagrams of FIG. 4B, the supply current Is at resonance is at its minimum level. Consequently, the total impedance at resonance is at its maximum value. This statement is not mathematically exact; but it may be regarded as substantially true, provided the value of the "Q" factor of the motor is sufficiently high.

The foregoing description of the preferred embodiment of the invention is to be considered as illustrative, and not as limiting. Various changes and modifications will occur to those skilled in the art, without departing from the true scope of the invention as defined in the appended claims. For example, series-resonance may be used for the electric motor windings in place of the parallel resonance described, for some applications.

We claim:

1. A propulsion system for a vehicle having a chassis and at least one drive wheel, said propulsion system including in combination:

a constant speed power source comprising an alternating current electric motor operated at a constant speed corresponding to its optimum performance;

a source of energy comprising a storage battery and an inverter connected to said electric motor for operating said electric motor of said constant speed power source;

a hydraulic fluid system including a main hydraulic pump coupled with said electric motor of said constant speed power source and driven thereby;

at least one hydraulic drive motor coupled with said hydraulic pump for receiving fluid flow therefrom; and means for varying the fluid flow through said main hydraulic pump to vary the speed of operation of said hydraulic drive motor.

2. The combination according to claim 1 wherein said drive motor is a variable displacement motor.

3. The combination according to claim 1 wherein the vehicle has first and second drive wheels, and said at least one hydraulic drive motor comprises first and second drive motors coupled, respectively, with said first and second drive wheels, with fluid from said main hydraulic pump being supplied in parallel to said first and second hydraulic drive motors.

4. The combination according to claim 3 wherein said first and second hydraulic drive motors are variable displacement hydraulic drive motors.

5. The combination according to claim 4 further including direction control means for selectively reversing the direction of fluid flow from said main hydraulic pump to said hydraulic drive motors.

6. The combination according to claim 5 wherein said electric motor is a resonant motor.

7. The combination according to claim 6 wherein said electric motor is a three-phase, alternating current parallel resonant motor, and said invertor is a direct current to three-phase invertor providing alternating current outputs at three phases.

8. The combination according to claim 7 wherein said parallel resonant motor has a winding with a parallel-connected capacitor across the output of each phase of said invertor.

9. The combination according to claim 8 wherein said inverter has an output signal with a frequency which is the frequency of resonance of said electric motor.

10. The combination according to claim 9 wherein said electric motor has a rotor, and further including an accumulator coupled with said main hydraulic pump for accumulating hydraulic fluid under pressure therein; a hydraulic starter motor connected with the rotor of said electric motor; and means for operating said hydraulic starter motor from said accumulator to rotate the shaft of said electric motor to cause said electric motor to attain a speed of rotation near said constant speed prior to coupling said source of energy thereto.

11. The combination according to claim 1 wherein said electric motor is a resonant motor.

12. The combination according to claim 11 wherein said electric motor is a three-phase, alternating current parallel resonant motor, and said invertor is a direct current to three-phase invertor providing alternating current outputs at three phases.

13. The combination according to claim 12 wherein said invertor has an output signal with a frequency which is the frequency of resonance of said electric motor.

14. The combination according to claim 13 wherein said electric motor has a rotor, and further including an accumulator coupled with said main hydraulic pump accumulating hydraulic fluid under pressure therein; a hydraulic starter motor connected with the rotor of said electric motor; and means for operating said hydraulic starter motor from said accumulator to rotate the shaft of said electric motor to cause said electric motor to attain a speed of rotation near said constant speed prior to coupling said source of energy thereto.

* * * * *